United States Patent
Hua

(10) Patent No.: US 10,860,210 B2
(45) Date of Patent: Dec. 8, 2020

(54) DIVISION RAID FOR DISK ARRAY EXPANSION

(71) Applicant: EMC IP Holding Company LLC, Hopkinton, MA (US)

(72) Inventor: Kuolin Hua, Natick, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

(21) Appl. No.: 16/363,702

(22) Filed: Mar. 25, 2019

(65) Prior Publication Data

US 2020/0310644 A1   Oct. 1, 2020

(51) Int. Cl.
*G06F 3/06* (2006.01)

(52) U.S. Cl.
CPC .......... *G06F 3/0604* (2013.01); *G06F 3/0632* (2013.01); *G06F 3/0644* (2013.01); *G06F 3/0689* (2013.01)

(58) Field of Classification Search
CPC .... G06F 3/0604; G06F 3/0644; G06F 3/0689; G06F 3/0632
USPC ......................................................... 711/154
See application file for complete search history.

(56) References Cited

U.S. PATENT DOCUMENTS

2005/0102551 A1* 5/2005 Watanabe ............. G06F 3/0607
714/6.2

\* cited by examiner

*Primary Examiner* — David Yi
*Assistant Examiner* — Zubair Ahmed
(74) *Attorney, Agent, or Firm* — Amin, Turocy & Watson, LLP

(57) ABSTRACT

Division RAID (Redundant Array of Independent Disks) for disk array expansion is provided herein. A data storage system as described herein can include a memory that stores computer executable components and a processor that executes computer executable components stored in the memory. The computer executable components can include a disk initialization component that divides a first storage disk into partitions comprising a uniform number of partitions; an array expansion component that adds the first storage disk to a logical storage array, wherein the logical storage array comprises second storage disks, the second storage disks respectively being divided into partitions comprising the uniform number of partitions; and a data allocation component that allocates a data group to respective partitions of the first storage disk and a subset of the second storage disks in a deterministic order, resulting in a set of allocated partitions.

20 Claims, 10 Drawing Sheets

400

| | Partition index | | | |
|---|---|---|---|---|
| Disk index | 1 | 2 | 3 | 4 |
| 1 | A | B | C | D |
| 2 | A | B | C | D |
| 3 | A | B | C | D |
| 4 | A | B | C | D |

| | Partition index | | | |
|---|---|---|---|---|
| Disk index | 1 | 2 | 3 | 4 |
| 1 | A | B | C | D |
| 2 | A | B | C | D |
| 3 | A | B | C | D |
| 4 | A | B | C | D |
| 5 | -- | B | C | D |

Partition index

|   | 1 | 2 | 3 | 4 |
|---|---|---|---|---|
| 1 | A | B | C | D |
| 2 | A | B | C | E |
| 3 | A | B | E | D |
| 4 | A | E | C | D |
| 5 | E | B | C | D |

Disk index

Partition index

|   | 1 | 2 | 3 | 4 |
|---|---|---|---|---|
| 1 | A | B | C | D |
| 2 | A | B | C | E |
| 3 | A | B | E | F |
| 4 | A | E | F | D |
| 5 | E | F | C | D |
| 6 | F | B | C | D |

Disk index

Partition index

|   | 1 | 2 | 3 | 4 |
|---|---|---|---|---|
| 1 | A | B | C | D |
| 2 | A | B | C | E |
| 3 | A | B | E | F |
| 4 | A | E | F | G |
| 5 | E | F | G | H |
| 6 | F | G | H | D |
| 7 | G | H | C | D |
| 8 | H | B | C | D |

Disk index

FIG. 9

DIVISION RAID FOR DISK ARRAY EXPANSION

TECHNICAL FIELD

The subject application is related to data storage systems, and more particularly, to techniques for managing storage disks in a data storage system.

BACKGROUND

Data stored at a computing system can be safeguarded by various measures to ensure their integrity in the event of equipment failure and/or other events. For instance, a Redundant Array of Independent Disks (RAID) array can be utilized to store data on multiple storage disks or other storage devices to mitigate the impact of individual drive failures. In general, RAID facilitates the storage of a group of data on multiple storage disks together with parity information that can enable reconstruction of the data in the event of one or more storage disk malfunctions. The parity information can be stored on the same disk(s) as the data group and/or different disk(s).

As computing technology continues to advance, the amount of data that can be generated and/or stored by computing systems is significantly increasing. Accordingly, it is desirable to implement techniques to implement RAID and/or other similar data protection measures with improved efficiency and cost effectiveness.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a disk initialization component that divides a first storage disk into partitions that include a uniform number of partitions, an array expansion component that adds the first storage disk to a logical storage array, where the logical storage array includes second storage disks that are respectively divided into partitions that include the uniform number of partitions, and a data allocation component that allocates a data group to respective partitions of the first storage disk and a subset of the second storage disks in a deterministic order, resulting in a set of allocated partitions.

In another aspect, a method is described herein. The method can include creating, by a device operatively coupled to a processor, partitions including a uniform number of partitions on a first storage disk, inserting, by the device, the first storage disk into a storage array, where the storage array includes a group of second storage disks that respectively have partitions including the uniform number of partitions, and allocating, by the device, a data group to respective partitions of the first storage disk and a subset of the second storage disks in a deterministic order, resulting in a set of allocated partitions In an additional aspect, a machine-readable medium including computer executable instructions is described herein. The instructions, when executed by a processor of a data storage system, can facilitate performance of operations including partitioning a first storage disk into a uniform number of partitions, appending the first storage disk to a storage array, where the storage array includes second storage disks that respectively have the uniform number of partitions, and assigning a data group to respective partitions of the first storage disk and at least one of the second storage disks in a deterministic order, resulting in assigned partitions.

DESCRIPTION OF DRAWINGS

Various non-limiting embodiments of the subject disclosure are described with reference to the following figures, wherein like reference numerals refer to like parts throughout unless otherwise specified.

FIGS. 4-5 are diagrams depicting example data migration operations that can be performed for a storage array in accordance with various aspects described herein.

FIGS. 7-9 are diagrams depicting respective storage array expansion operations that can be performed together with the operations depicted in FIGS. 4-5 in accordance with various aspects described herein.

DETAILED DESCRIPTION

Figure 1:
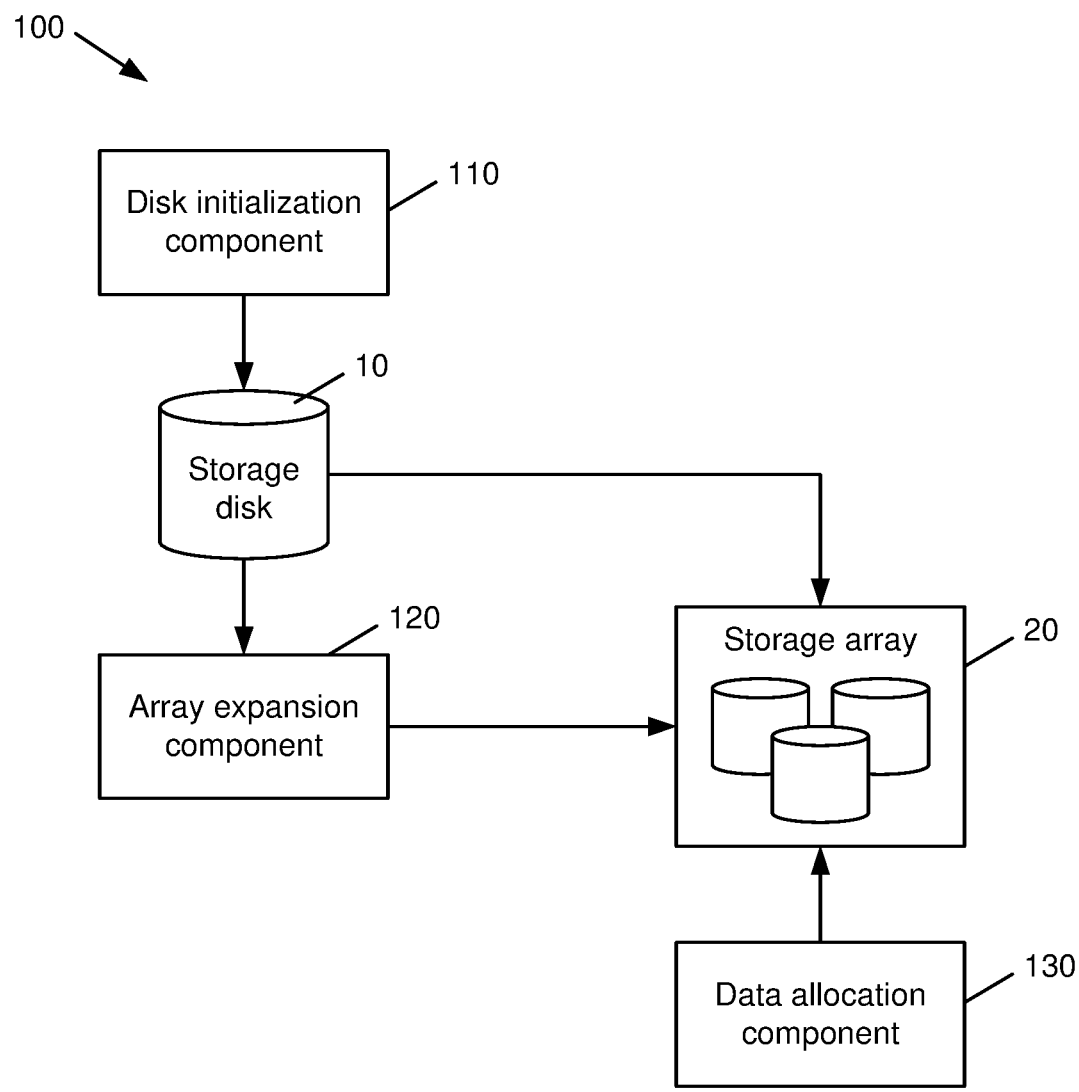
FIG. 1 is a block diagram of a system that facilitates division RAID for disk array expansion in a data storage system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

As computing technology advances, a growing number of fields are utilizing computing systems in ways that are generating and processing ever-increasing amounts of data. By way of example, the media and entertainment industries often utilize large high-definition audio and/or video files, the e-commerce industry manages large amounts of customer and transaction data among other types of data, the research field often generates large datasets for analysis and/or experimentation, and so on.

In a typical computing system, such data is stored on storage disks and/or other appropriate storage devices. As the amount of data associated with a computing system continues to grow in response to advances in computing technology, the demand for more and/or larger storage devices will similarly increase. Additionally, various data protection measures have been developed to protect data associated with a computing system in the event of disk failure, system malfunctions, accidental data erasure, and/or other events that can result in a loss of stored data. For example, RAID (Redundant Array of Independent Disks) is a data protection technique in which data are distributed over multiple independent storage disks. A group of storage disks configured in this manner can be referred to as an array or a RAID array. In some cases, RAID can additionally introduce mirroring, parity, and/or other measures by which redundant information can be introduced into the system to enable information stored on one or more disks of a RAID array to be recovered in the event of a disk failure.

Conventionally, however, expanding an amount of available storage in a computing system that utilizes RAID involves the addition of a complete new RAID array, which can potentially include a large number of storage disks (e.g., 16 disks for RAID 5 (15+1), 14 disks for RAID 6 (12+2), etc.). The introduction of additional complete storage arrays into a computing system can result in large amounts of setup time, equipment and/or maintenance costs, and/or other inefficiencies that can limit the ability of a system operator to expand the amount of available system storage.

To the above and/or related ends, various embodiments provided herein can enable the use of techniques referred to herein as Division RAID, wherein respective disks associated with a system can be divided into respective partitions (e.g., equally sized partitions) such that data groups can be distributed over these partitions in various ways to enable single-disk expansion. By enabling single-disk expansion as opposed to expansion in complete RAID groups, the costs and complexity associated with expanding storage capacity of a computing system can be reduced in comparison to systems that utilize conventional RAID techniques.

By implementing various embodiments as described herein, various improvements to the operation of a computing system and/or other advantages can be achieved. These can include, but are not limited to the following. The number of storage disks associated with a computing system can be reduced. Overall power consumption of a computing system, e.g., power consumption of storage disks, storage adapters, or the like, can be reduced. Maintenance and/or operation costs associated with a computing system can be reduced. Data storage and/or retrieval speed can be increased. Other advantages are also possible.

With reference now to the drawings, FIG. 1 illustrates a system 100 that facilitates division RAID for disk array expansion in a data storage system in accordance with various aspects described herein. As shown in FIG. 1, system 100 includes a disk initialization component 110 that can divide a first storage disk 10 into a uniform number of partitions. System 100 as shown in FIG. 1 further includes an array expansion component 120 that can add the storage disk 10 to a logical storage array 20. In an aspect, the storage array 20 can include one or more second storage disks that have been divided, e.g., by the disk initialization component 110, into the same uniform number of partitions as the first storage disk 10.

In an aspect, the storage array 20 can be a RAID array and/or another grouping of storage disks that provides for redundancy and/or data recovery. Additionally, the uniform number of partitions at the storage disk 10 and/or the disks of the storage array 20, e.g., as generated by the disk initialization component 110, can be the same as an initial number of disks in the storage array 20 (e.g., the number of disks in the storage array 20 prior to addition of the storage disk 10). By way of example, respective disks of a storage array 20 configured according to RAID 5, e.g., 4 disks, can be divided into 4 partitions each. Other partitioning configurations could also be used.

The system shown in FIG. 1 further includes a data allocation component 130 that can allocate a data group, also referred to herein as a RAID group, to respective partitions of the storage disk 10 and the disks of the storage array 20 in a predefined and/or otherwise deterministic order. For instance, a new RAID group can be assigned to respective partitions of the storage disk 10 and the disks of the storage array 20 according to a uniform pattern. This can be done in order to more readily accommodate further expansions to the storage array 20, to provide standard and predictable data reliability policies for respective RAID groups stored by the storage array 20, and/or for other purposes. Example techniques for allocating partitions for new RAID groups are described in further detail below.

In an aspect, the partitions of the storage disk 10 and the disks of the storage array 20 can each be configured to be equal or near equal in size in order to facilitate the generation and migration of discrete data groups in various manners as will be discussed below. Generation of uniformly sized partitions can also be used to reduce variance in the time associated with writing RAID groups to various ones of the partitions, which can improve overall system efficiency by streamlining read/write operations on different storage disks, including the storage disk 10 and the disks of the storage array 20, where applicable.

Figure 2:
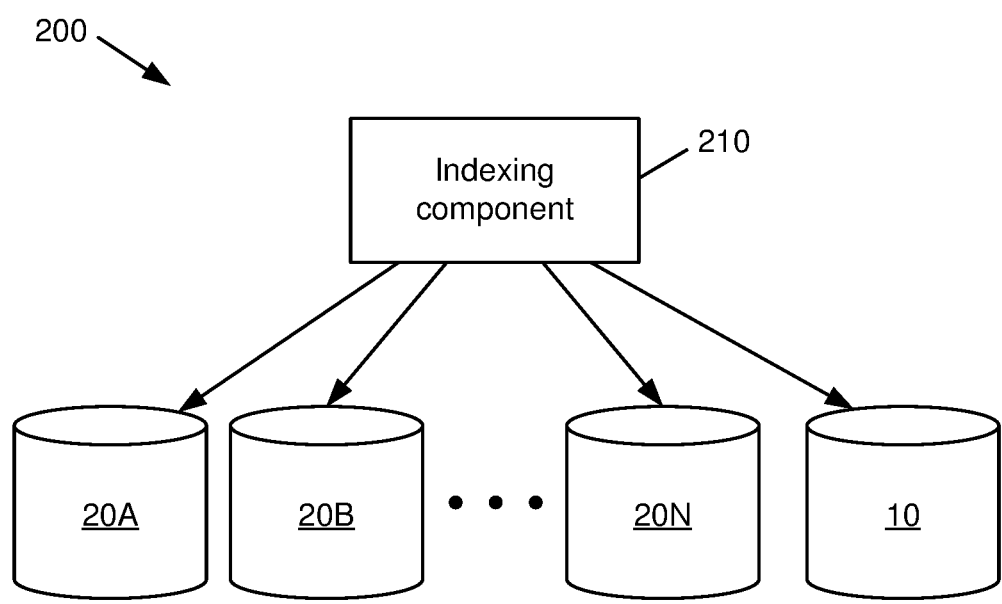
FIG. 2 is a block diagram of a system that facilitates indexing a set of storage disks associated with a data storage system in accordance with various aspects described herein.

Turning now to FIG. 2, a block diagram of a system 200 that facilitates indexing a set of storage disks associated with a data storage system in accordance with various aspects described herein is illustrated. Repetitive description of like elements employed in other embodiments described herein is omitted for brevity. As shown in FIG. 2, system 200 includes an indexing component 210 that can assign indexes to respective disks in system 200, such as the storage disk 10 and the disks of the storage array 20, and/or respective partitions of those and/or other disks. As shown in FIG. 2, the disks of the storage array 20 are illustrated as a set of N disks 20A-20N. It should be appreciated, however, that the naming convention used for the disks 20A-20N of the storage array 20 as shown in FIG. 2 are not intended to imply any specific number of disks in the storage array 20. Rather, the disks 20A-20N of the storage array 20 as shown by FIG. 2 can include any suitable number of disks, including one disk and/or multiple disks.

In an aspect, indexes assigned by the indexing component 210 can be used, e.g., by the data allocation component 130 shown in FIG. 1 and/or other components as described herein, to facilitate the assignment of RAID groups and/or other segments of information in a deterministic pattern across respective partitions of the disks 20A-20N and/or 10. For instance, RAID groups and/or other data segments can be assigned to respective disks 20A-20N and 10, and/or partitions of said disks 20A-20N and 10, as a function of their disk and/or partition indexes. Examples of patterns that can be utilized for this purpose are described in further detail below.

In an aspect, the indexing component 210 can assign partition indexes to respective partitions of associated storage disks, such as disks 20A-20N and 10, in a uniform manner consistent with the uniform partitions created on said disks, e.g., by the disk initialization component 110. Also, or alternatively, the indexing component 210 can assign disk indexes such that the storage disk 10 is indexed in relation to the disks 20A-20N in the array subsequent to addition of the disk 10 to the array 20, e.g., by the array expansion component 120. For instance, the indexing component 210 can assign disk indexes such that the storage disk 10 is indexed subsequent to the disks 20A-20N of the storage array 20. Stated another way, the storage disk 10 can be assigned an index by the indexing component 210 that follows an index of the last-indexed disk in the storage array 20. Thus, for example, for a storage array 20 having disks with indexes 1-4, the storage disk 10 can be assigned index 5 by the indexing component 210. Other techniques could also be used.

Figure 3:
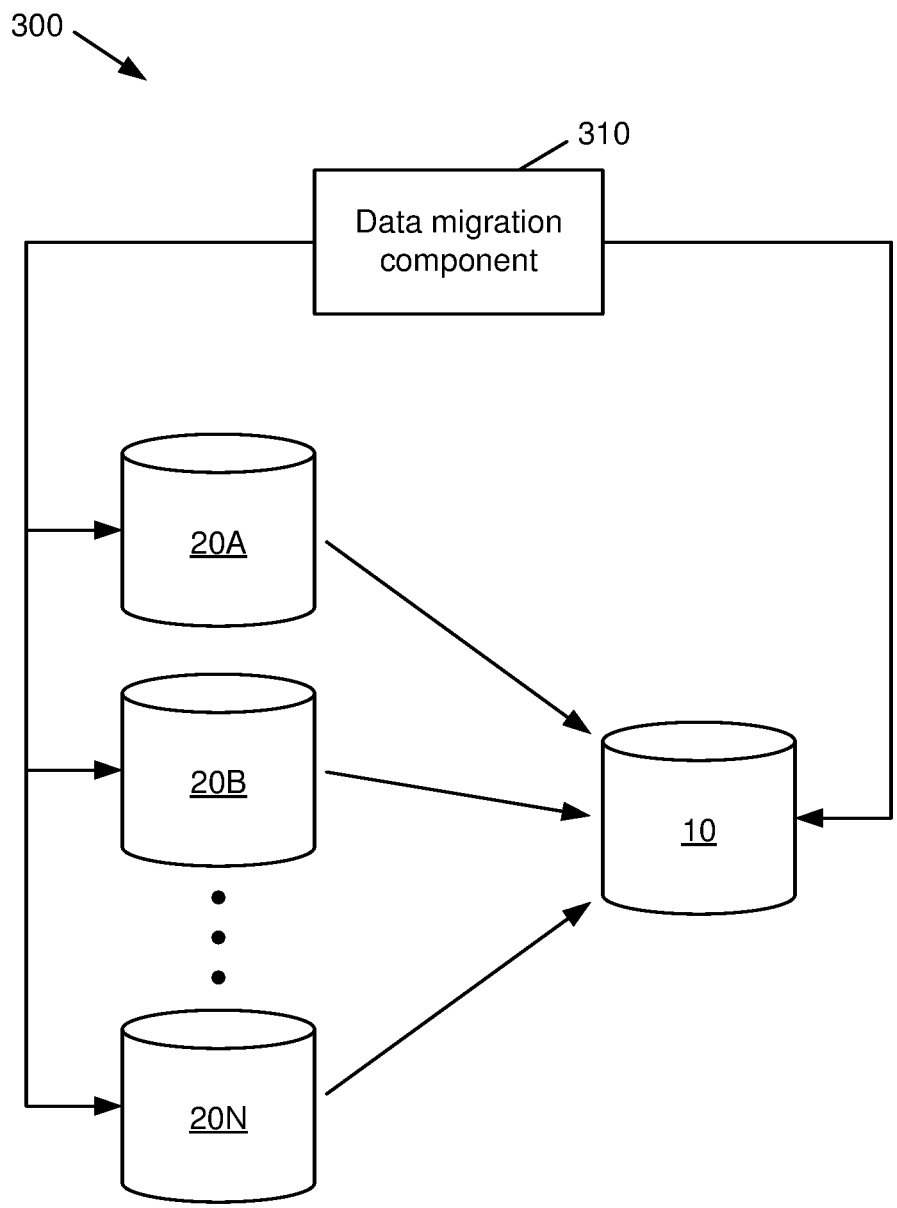
FIG. 3 is a block diagram of a system that facilitates migrating data from respective storage disks of a storage array to an additional storage disk in accordance with various aspects described herein.

With reference next to FIG. 3, a block diagram of a system 300 that facilitates migrating data from respective storage disks of a storage array to an additional storage disk in accordance with various aspects described herein is illustrated. Repetitive description of like elements employed in other embodiments described herein is omitted for brevity. In an aspect, system 300 as shown by FIG. 3 can be utilized to perform initial actions associated with storing an additional RAID group and/or other data group(s) at the storage array 20 following the introduction of the storage disk 10 to the storage array 20 by the array expansion component 120 and the application of disk and partition indexes by the indexing component 210 as shown by FIG. 2.

In an aspect, system 300 as shown by FIG. 3 includes a data migration component 310, which can copy and/or otherwise migrate data stored at respective partitions of disks 20A-20N of the storage array 20 to the storage disk 10 added to the storage array 20 by the array expansion component 120.

In another aspect, the data allocation component 130 as shown by FIG. 1 can designate partitions of the disks 20A-20N for a new RAID group such that the designated partitions are associated with mutually exclusive partition indexes. Stated another way, the data allocation component 130 can designate partitions such that a partition corresponding to a given partition index is designated on no more than one of the disks 20A-20N. By designating partitions using mutually exclusive partition indexes, the data migration component 310 can facilitate copying of data stored at the designated partitions of the disks 20A-20N to the corresponding indexed partitions of the storage disk 10.

By way of specific, non-limiting example, diagram 400 in FIG. 4 depicts a matrix representing the initial state of a storage array 20 as shown by FIG. 1. Here, the storage array 20 is an array of 4 disks (e.g., according to a RAID 5 configuration that includes 3 data disks and 1 parity disk per RAID array) having disk indexes 1-4, respectively. Each disk in the storage array 20 is also divided into 4 partitions, similarly having partition indexes 1-4. This results in a 4×4 matrix as shown in diagram 400, where each row represents a disk (e.g., by disk index) and each column represents a partition index. In the example shown by diagram 400, 4 RAID groups, labeled A, B, C, and D, are distributed vertically in the matrix. Stated another way, each RAID group is stored on each disk in the storage array 20 at a given partition index. Thus, for example, RAID group A is stored at partition index 1 of disks 1-4, RAID group B is stored at partition index 2 of disks 1-4, and so on.

Following the initial state of the storage array 20 as shown in diagram 400, an additional storage disk 10 can be added to the storage array 20 as shown by diagram 500 in FIG. 5. As illustrated by diagram 500, the new storage disk 10 can be indexed subsequently to the other disks of the storage array 20, resulting in the new storage disk 10 being given disk index 5. Additionally, the new storage disk 10 can be divided into similar partitions to the other disks in the storage array 20 with corresponding partition indexes 1-4.

As further shown by diagram 500, RAID groups corresponding to respective partition indexes associated with the storage array 20 can be migrated onto corresponding partitions of the new storage disk 10. Here, RAID groups B, C, and D have been migrated onto partitions 2, 3, and 4 of the new storage disk 10, respectively.

Figure 6:
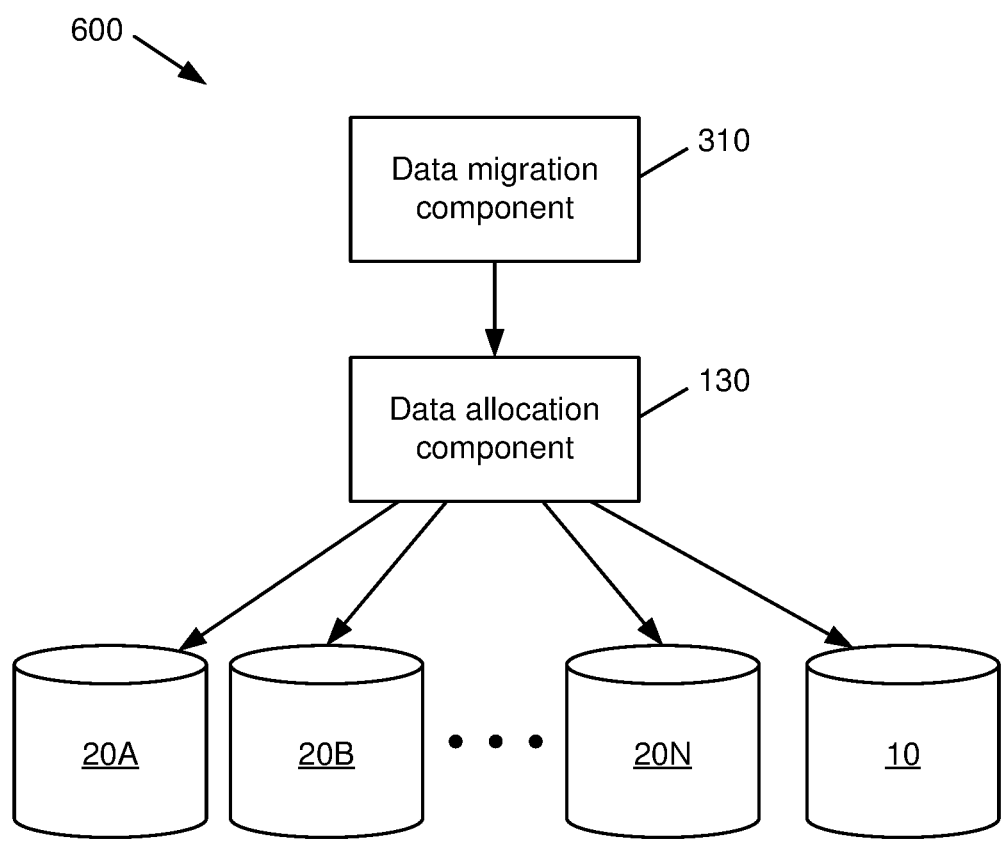
FIG. 6 is a block diagram of a system that facilitates data migration and RAID group allocation for respective storage disks of a storage array in accordance with various aspects described herein.

Referring now to FIG. 6, a block diagram of a system 600 that facilitates data migration and RAID group allocation for respective storage disks of a storage array in accordance with various aspects described herein is illustrated. Repetitive description of like elements employed in other embodiments described herein is omitted for brevity. As shown in FIG. 6, the data allocation component 130 can allocate a new RAID group and/or other data group(s) to the expanded storage array 20 including disks 20A-20N and 10 in response to migration as performed by the data migration component 310 as described above with respect to FIGS. 3-5. In an aspect, the data allocation component 130 can allocate a data group to respective allocated and/or otherwise designated partitions in response to operation of the data migration component 310 being completed. Alternatively, the data allocation component 130 can allocate data groups to respective partitions of the disks 20A-20N and 10 incrementally in combination with some or all of the migration as performed by the data migration component 310. Other techniques for allocating RAID groups could also be used.

Continuing from diagram 500 in FIG. 5, a specific, non-limiting example of data allocation that can be performed by the data allocation component 130 is shown by diagram 700 in FIG. 7. In the example illustrated by FIG. 7, a new RAID group E can be distributed within the expanded matrix that was created as shown by diagram 500. Here, RAID group E is distributed by descending order of disk index and ascending order of partition index, resulting in a diagonal distribution for RAID group E with respect to diagram 700.

As further illustrated by diagram 700, allocation of RAID group E along the diagonal results in the matrix being split into two triangles that are separated by the diagonal associated with RAID group E. The lower triangle shown in diagram 700 contains 1 member of group B, 2 members of group C, and 3 members of group D. The upper triangle contains the remaining group members of RAID groups A, B, C, and D. By assigning the RAID groups in a preset pattern, such as the diagonal allocation shown by diagram 700, the performance of the associated storage array 20 can be more accurately modeled, and unexpected errors associated with individual device failures can be better avoided in comparison to allocation techniques that assign RAID groups non-deterministically.

In an aspect, an example approach for assigning RAID groups to respective disk partitions according to a Division RAID technique, e.g., as illustrated by FIGS. 4-5 and 7 above, can be summarized in a partial pseudocode format as follows. It should be appreciated, however, that the following is merely one example of a technique that can be utilized to facilitate Division RAID in a data storage system, and that other techniques could also be utilized without departing from the scope of the embodiments described herein.

In an aspect, the example Division RAID approach can be performed according to a RAID protection scheme that utilizes arrays of K=N+P disks, where N is the number of data members per array, P is the number of parity members per array, and K is the total number of disks per array. Next, each disk of the K disks can be divided into K partitions. This can result conceptually in a matrix of K rows (corresponding to disks) by K columns (corresponding to partitions), such as that shown by diagram 400.

Next, K RAID groups can be created over the K disks using one partition per disk. In an aspect, the RAID groups can be created using partitions at the K disks having the same partition index, resulting conceptually in each RAID group being a column of the matrix, e.g., as further shown by diagram 400. A new disk can then be divided into K partitions in the same manner as the K original disks of the storage array, e.g., as shown conceptually by diagram 500. Based on this configuration of K+1 disks, a K+1-th RAID group can be allocated to the respective disks by allocating and copying respective partitions as follows:

```
Group[K+1].Allocate( Disk[K+1].Partition[1] );
for( i=2; i<=K; i++ ) {
    Disk[K+1].Partition[i] = Disk[K+2−i].Partition[i];
    Group[K+1].Allocate( Disk[K+2−i].Partition[i] );
}
```

The result of the above pseudocode is a new RAID group allocated to respective partitions along a diagonal of the matrix, e.g., as shown by diagram 700.

In an aspect, additional disks can be added to the storage array by repeating some or all of the operations described above. For instance, as shown by diagram 800 in FIG. 8, after adding another new disk with disk index 6, a new RAID group F can be added along the diagonal defined by RAID group E as previously added as shown by diagram 700, thereby growing the diagonal created for RAID group E. In response to the addition of RAID group F, the lower triangle below the diagonal can be shifted downward to higher-indexed disks, as further shown by diagram 800.

As shown by diagram 800, disk array expansion can be accomplished by growing the diagonal corresponding to new RAID groups. As further shown by diagram 900 in FIG. 9, after adding two more disks and two more RAID groups G and H, the diagonal can grow again to accommodate the new RAID groups in a similar manner to that described above. In general, it should be appreciated that while the number of disks in the storage array prior to expansion and the number of partitions will not be equal for additional disks beyond the first, e.g., the disks and partitions will form a (K+n)×K matrix where n is the number of additional disks previously added to the storage array, further expansion of the storage array can occur in the same manner as in the original case of a K×K matrix.

In an aspect, the growth pattern shown by diagrams 800 and 900 for an initial 4×4 matrix illustrate that the RAID group members on any given disk can be configured such that they are distributed to no more than 6 other disks. More generally, for a system (e.g., RAID 5) that utilizes storage arrays of size N+1 that include N data members and 1 parity member, the RAID group members on any given disk can be configured to be distributed to a limit of 2N other disks. As a result, the risk of data loss associated with double disk failures can be limited as compared to conventional approaches.

Figure 10:
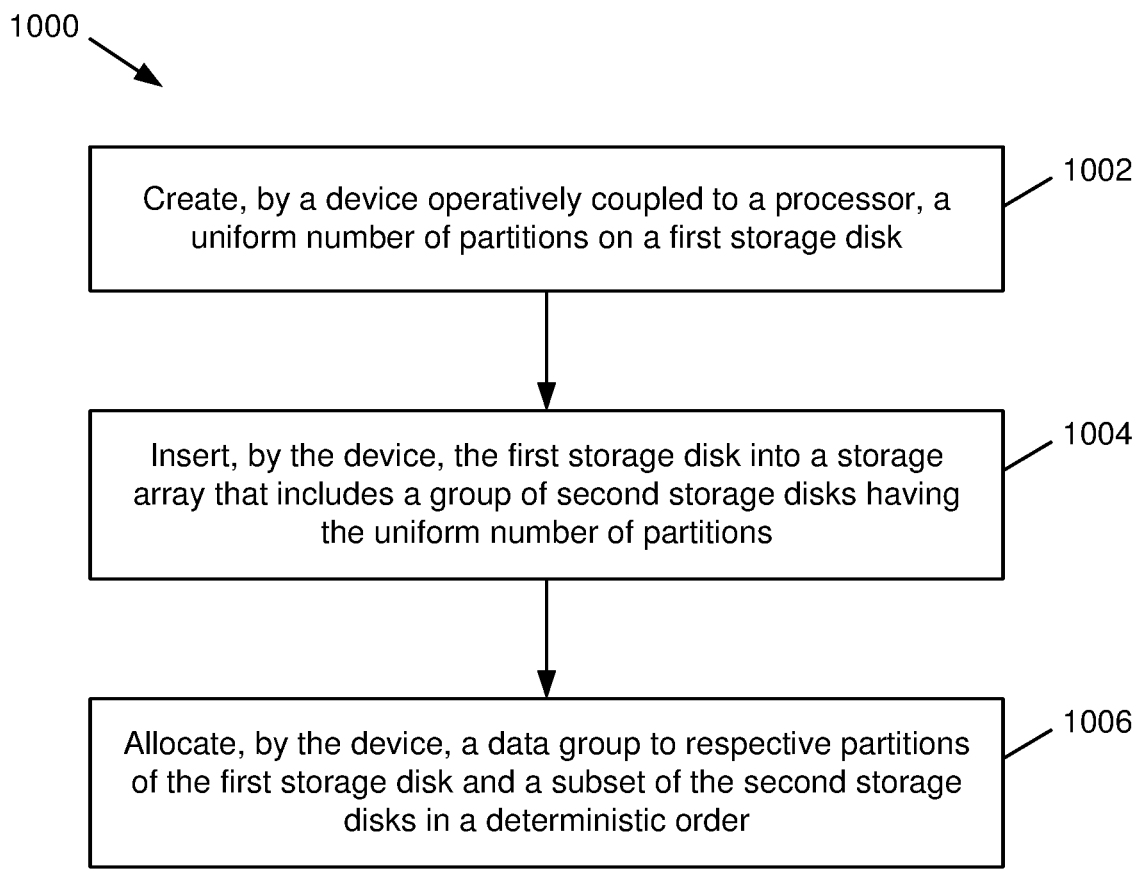
FIG. 10 is a flow diagram of a method that facilitates division RAID for disk array expansion in a data storage system in accordance with various aspects described herein.

With reference now to FIG. 10, presented is a flow diagram of a method 1000 that facilitates division RAID for disk array expansion in a data storage system in accordance with various aspects described herein. At 1002, a device operatively coupled to a processor can create (e.g., by a disk initialization component 110) a uniform number of partitions on a first storage disk (e.g., a storage disk 10).

At 1004, the device can insert (e.g., by an array expansion component 120) the first storage disk for which partitions were created at 1002 into a storage array (e.g., a storage array 20) that includes a group of second storage disks having the uniform number of partitions (e.g., as generated by the disk initialization component and/or by other means).

At 1006, the device can allocate (e.g., by a data allocation component 130) a RAID group and/or another data group to respective partitions of the first storage disk and the second storage disks of the storage array in a deterministic order.

FIG. 10 as described above illustrates a method in accordance with certain aspects of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that method can alternatively be represented as a series of interrelated states or events, such as in a state diagram. Moreover, not all illustrated acts may be required to implement methods in accordance with certain aspects of this disclosure.

Figure 11:
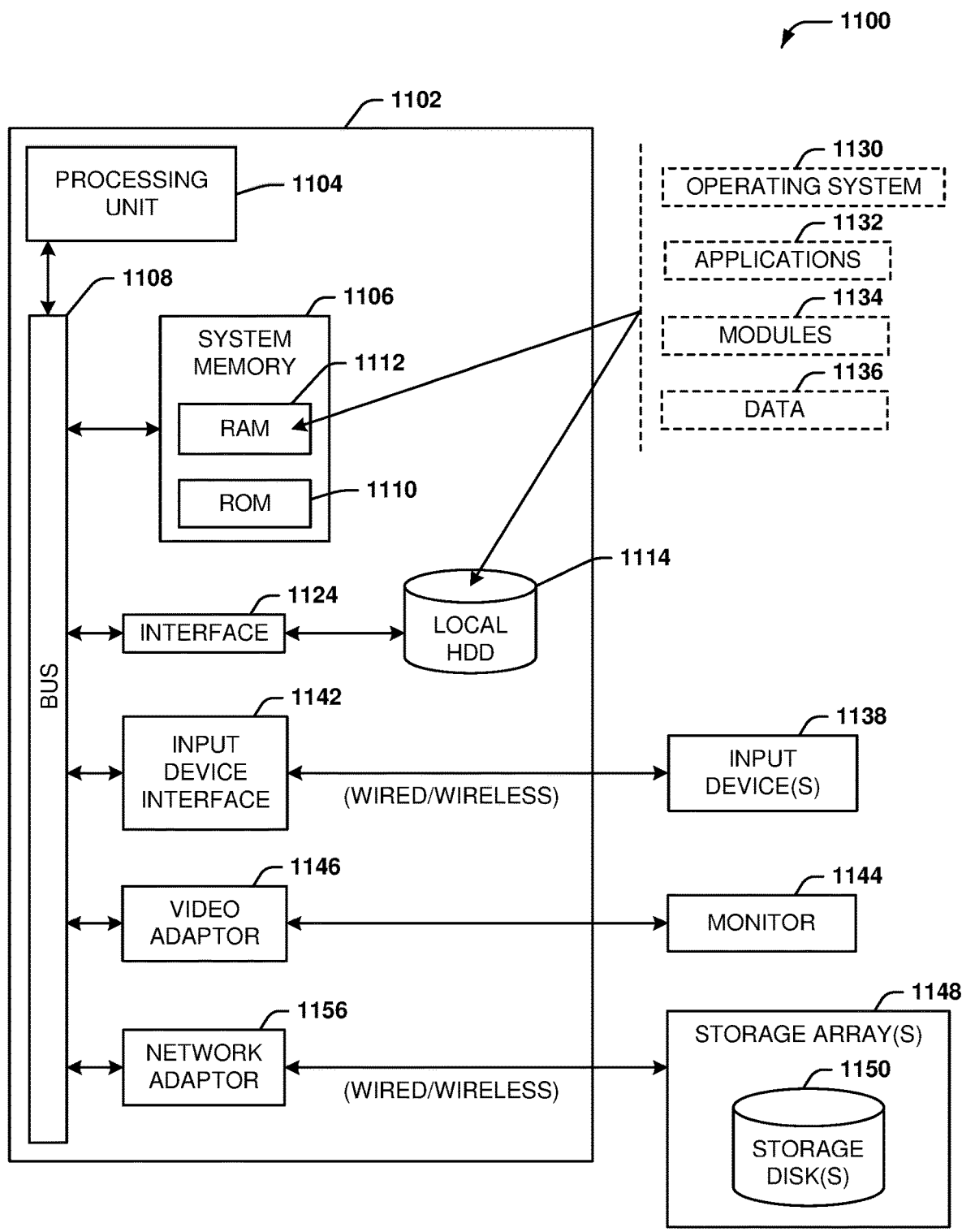
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computing device 1102 (e.g., a server, an embedded system, etc.). In some implementations, the computing device 1102 can include a processing unit 1104, a system memory 1106 and a system bus 1108. The system bus 1108 couples system components including, but not limited to, the system memory 1106 to the processing unit 1104. The processing unit 1104 can include any suitable number and/or types of processors. For instance, in an environment 1100 associated with a data storage system, the processing unit 1104 can include one or more embedded processors and/or microcontrollers. Also or alternatively, the processing unit 1104 can include processors which can be any of various commercially available processors.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computing device 1102, such as during startup. The RAM 1112 can also include a high-speed RAM such as static RAM for caching data.

The computing device 1102 can further include one or more devices that provide local storage, such as a local hard disk drive (HDD) 1114 (e.g., EIDE, SATA). Other storage devices, such as optical disk drives, external HDDs, or the like, can also be employed as suitable for a particular implementation. The HDD 1114 and/or other storage devices can be connected to the system bus 1108 by an HDD interface 1124 and/or other suitable interfaces.

The local storage devices and/or their associated computer-readable storage media provide nonvolatile storage of data, data structures, computer-executable instructions, and so forth. For the computing device 1102, the drives and storage media accommodate the storage of any data in a suitable digital format.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computing device 1102 through one or more wired/wireless input devices 1138, e.g., a keyboard, a pointing device such as a mouse or touchpad, a microphone, an infrared (IR) remote control, a stylus pen, a touch screen, etc. The input devices 1138 can be connected to the processing unit 1104 through an input device interface 1142 that can be coupled to the system bus 1108, but can be connected by other interfaces, such as a parallel port, an IEEE 1394 serial port, a USB port, an IR interface, etc. A monitor 1144 or other type of display device can be also connected to the system bus 1108 via an interface, such as a video adapter 1146.

The computing device 1102 can operate in a networked environment, e.g., in a storage area network (SAN) environment, using logical connections via wired and/or wireless communications, as established by a network adaptor 1156, to one or more remote entities such as remote computers, one or more storage arrays 1148, etc. Remote computers associated with the computing device 1102 can include workstations, server computers, routers, peer devices or other common network nodes, etc. Storage arrays 1148 connected to the computing device 1102 via the network adaptor 1156 can include respective storage disks 1150, which can be configured in any suitable logical and/or physical configurations.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and
   a processor that executes computer executable components stored in the memory, wherein the computer executable components comprise:
      a disk initialization component that divides a first storage disk into partitions comprising a uniform number of partitions;
      an array expansion component that adds the first storage disk to a logical storage array, wherein the logical storage array comprises second storage disks, the second storage disks respectively being divided into partitions comprising the uniform number of partitions;
      an indexing component that assigns disk indexes to the first storage disk and the second storage disks, resulting in the first storage disk being indexed subsequent to the second storage disks, and further assigns partition indexes to respective partitions of the first storage disk and the second storage disks, wherein the disk indexes and the partition indexes define a matrix representing the logical storage array; and
      a data allocation component that allocates a data group to respective partitions of the first storage disk and a subset of the second storage disks according to a uniform pattern along a diagonal of the matrix representing the logical storage array, resulting in a set of allocated partitions.

2. The data storage system of claim 1, wherein the respective partitions of the first storage disk and the second storage disks are equal in size.

3. The data storage system of claim 1, wherein the data allocation component designates the set of allocated partitions resulting in the allocated partitions of the set of allocated partitions being associated with mutually exclusive partition indexes.

4. The data storage system of claim 3, wherein the data group is a first data group, wherein the second storage disks have stored thereon respective second data groups, and wherein the computer executable components further comprise:
   a data migration component that copies data from the second data groups as stored on the set of allocated partitions at the subset of the second storage disks to corresponding indexed partitions of the first storage disk.

5. The data storage system of claim 4, wherein the data allocation component allocates the first data group to the set of allocated partitions in response to operation of the data migration component being completed.

6. The data storage system of claim 1, wherein the data allocation component designates, via the uniform pattern, the set of allocated partitions by descending order of disk index and ascending order of partition index.

7. The data storage system of claim 1, wherein the second storage disks comprise a number of storage disks that are equal to the uniform number of partitions.

8. The data storage system of claim 6, wherein the disk initialization component further divides a third storage disk into partitions comprising the uniform number of partitions, wherein the array expansion component adds the third storage disk to the logical storage array, and wherein the indexing component assigns the partition indexes to the partitions of the third storage disk and further assigns a disk index of the disk indexes to the third storage disk such that the third storage disk is indexed subsequent to the first storage disk.

9. The data storage system of claim 8, wherein the set of allocated partitions is a first set of allocated partitions, and wherein, in response to the third storage disk being added to the logical storage array by the array expansion component, the data allocation component further designates a second set of allocated partitions via the uniform pattern by the descending order of disk index and the ascending order of partition index.

10. The data storage system of claim 9, wherein the diagonal of the matrix is a first diagonal, and wherein the data allocation component designates the second set of allocated partitions along a second diagonal of the matrix that is adjacent to the first diagonal.

11. A method, comprising:
creating, by a device operatively coupled to a processor, partitions comprising a uniform number of partitions on a first storage disk;
inserting, by the device, the first storage disk into a storage array, wherein the storage array comprises a group of second storage disks, the second storage disks of the group respectively having partitions comprising the uniform number of partitions;
indexing, by the device, the first storage disk and the second storage disks such that the first storage disk is indexed subsequent to the second storage disks, resulting in disk indexes associated with the first storage disk and the second storage disks;
indexing, by the device, the respective partitions of the first storage disk and the second storage disks, resulting in partition indexes associated with the first storage disk and the second storage disks, wherein the disk indexes and the partition indexes define a matrix representing the storage array; and
allocating, by the device, a data group to respective partitions of the first storage disk and a subset of the second storage disks according to a uniform pattern along a diagonal of the matrix representing the storage array, resulting in a set of allocated partitions.

12. The method of claim 11, wherein the respective partitions of the first storage disk and the second storage disks are equally sized.

13. The method of claim 11, further comprising:
designating, by the device, the set of allocated partitions such that the allocated partitions of the set of allocated partitions are associated with mutually exclusive partition indexes.

14. The method of claim 13, wherein the data group is a first data group, wherein the second storage disks have stored thereon respective second data groups, and wherein the method further comprises:
migrating, by the device, data from the second data groups as stored on the set of allocated partitions at the subset of the second storage disks to corresponding indexed partitions of the first storage disk, wherein the allocating comprises allocating the first data group to the set of allocated partitions in response to the migrating being completed.

15. The method of claim 11,
wherein the uniform pattern results in the set of allocated partitions being designated by descending order of disk index and ascending order of partition index.

16. A non-transitory machine-readable medium comprising computer executable instructions that, when executed by a processor, facilitate performance of operations, the operations comprising:
partitioning a first storage disk into a uniform number of partitions;
appending the first storage disk to a storage array, wherein the storage array comprises a plurality of second storage disks respectively having the uniform number of partitions;
assigning disk indexes to the first storage disk and the plurality of second storage disks resulting in the first storage disk being indexed subsequent to the plurality of second storage disks;
assigning partition indexes to the respective partitions of the first storage disk and the plurality of second storage disks, wherein the disk indexes and the partition indexes define a matrix representing the storage array; and
assigning a data group to respective partitions of the first storage disk and at least one of the plurality of second storage disks according to a uniform pattern along a diagonal of the matrix representing the storage array, resulting in assigned partitions.

17. The non-transitory machine-readable medium of claim 16, wherein the respective partitions of the first storage disk and the plurality of second storage disks are of a uniform partition size.

18. The non-transitory machine-readable medium of claim 16, wherein the operations further comprise:
generating the assigned partitions resulting in respective ones of the assigned partitions being associated with mutually exclusive partition indexes.

19. The non-transitory machine-readable medium of claim 18, wherein the data group is a first data group, wherein the second storage disks have stored thereon respective second data groups, and wherein the operations further comprise:
migrating data from the second data groups as stored on the assigned partitions at the at least one of the plurality of second storage disks to corresponding indexed partitions of the first storage disk; and
allocating the first data group to the assigned partitions in response to completion of the migrating.

20. The non-transitory machine-readable medium of claim 18, wherein:
the uniform pattern results in the assigned partitions being generated by descending order of disk index and ascending order of partition index.

* * * * *